United States Patent [19]

Chase

[11] 4,055,004
[45] Oct. 25, 1977

[54] FULL COLOR HYBRID DISPLAY FOR AIRCRAFT SIMULATORS

[75] Inventor: Wendell D. Chase, Saratoga, Calif.

[73] Assignee: The United States of America as represented by the Administrator of the National Aeronautics and Space Administration, Washington, D.C.

[21] Appl. No.: 623,536

[22] Filed: Oct. 17, 1975

[51] Int. Cl.² .......................... G09B 9/08; H04N 7/18
[52] U.S. Cl. ................................... 35/12 N; 358/104
[58] Field of Search .................. 35/12 N, 12 W, 10.2, 35/11 A; 178/DIG. 35; 40/34; 340/324 AD, 324 A; 358/81, 82, 104

[56] References Cited

U.S. PATENT DOCUMENTS

| | | | |
|---|---|---|---|
| 1,684,534 | 9/1928 | Campbell | 40/34 |
| 3,373,506 | 3/1968 | Davidoff | 35/12 N |
| 3,401,228 | 9/1968 | Barnes | 35/12 N X |
| 3,486,242 | 12/1969 | Aronson | 35/11 A |
| 3,542,933 | 11/1970 | Davidoff | 35/12 N X |
| 3,548,515 | 12/1970 | Simon | 35/12 N |
| 3,573,338 | 4/1971 | Davidoff | 35/12 N X |
| 3,679,297 | 7/1972 | Searle et al. | 35/12 N X |
| 3,711,826 | 1/1973 | Russa | 35/12 N X |
| 3,804,977 | 4/1974 | Driskell | 35/11 A |
| 3,862,358 | 1/1975 | Wolff | 35/11 A |
| 3,895,183 | 7/1975 | Collier | 35/11 A X |
| 3,915,548 | 10/1975 | Opittek et al. | 35/12 N X |

Primary Examiner—William H. Grieb
Assistant Examiner—Vance Y. Hum
Attorney, Agent, or Firm—Darrell G. Brekke; Armand McMillian; John R. Manning

[57] ABSTRACT

A display for an aircraft simulator that produces an image of an air strip or the like that is accurate in color and in relative light intensity. A television camera supported over a terrain model that simulates an aircraft landing zone, a full spectrum color monitor connected to the camera and lens system for projecting the monitor image onto a lens or screen visually accessible to a trainee in the simulator. The camera is supported on a gantry frame and is movable in six degrees of freedom. There is a control yoke and like simulated aircraft controls accessible to the trainee the outputs of which are linked to the gantry frame. A monochromatic calligraphic display, a digital computer for producing a pattern on the display that corresponds to the lights associated with the landing strip on the terrain model and an optical system for projecting the calligraphic image onto the same lens so that it is superposed on the video representation on the landing field. The optical system includes a four-color wheel which is rotated between the calligraphic display and the lens, and apparatus for synchronizing the generation of a calligraphic pattern with the different color segments on the color wheel. A servo feedback system responsive to the position and velocity of the servo motors on the gantry frame for producing an input to the computer so that the calligraphically generated signal corresponds in shape, size and location to the video signal.

7 Claims, 10 Drawing Figures

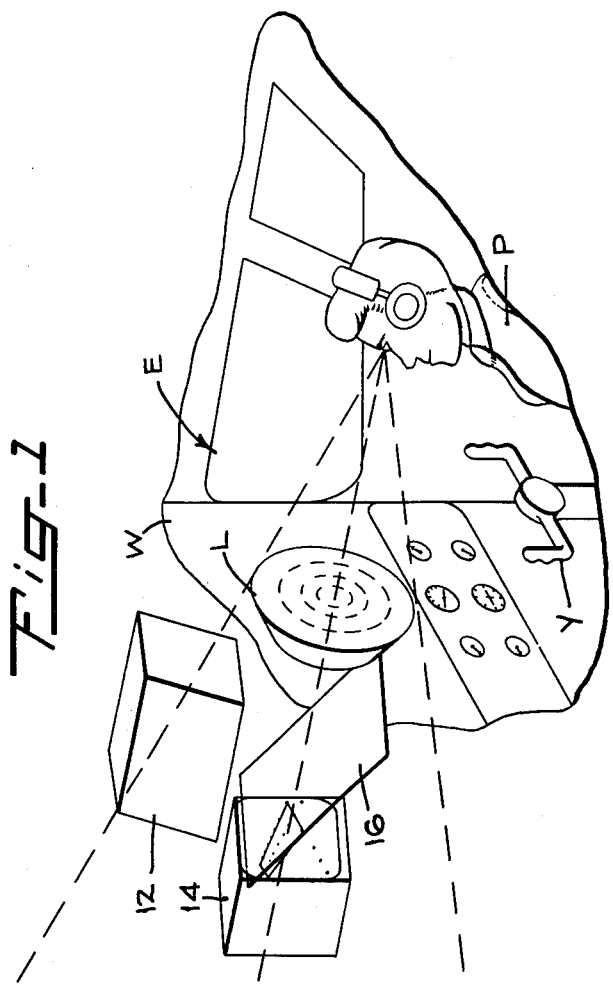
Fig-1
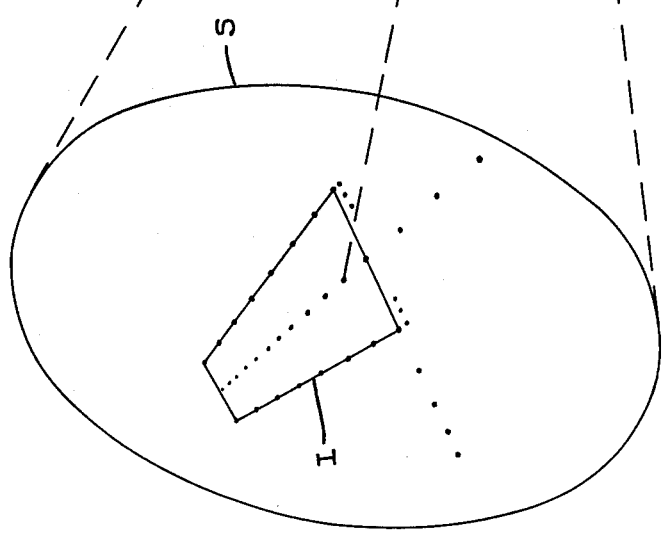

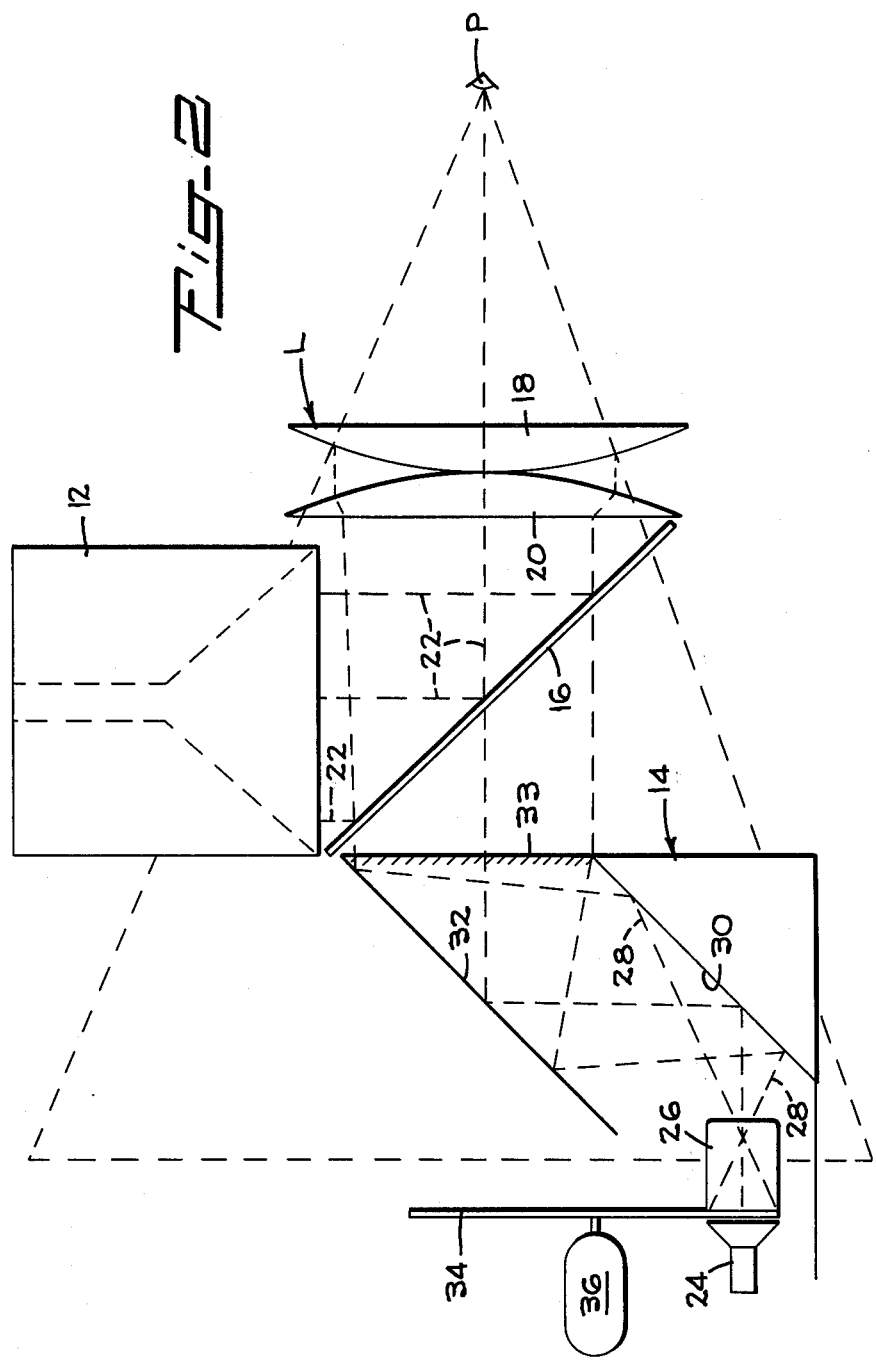

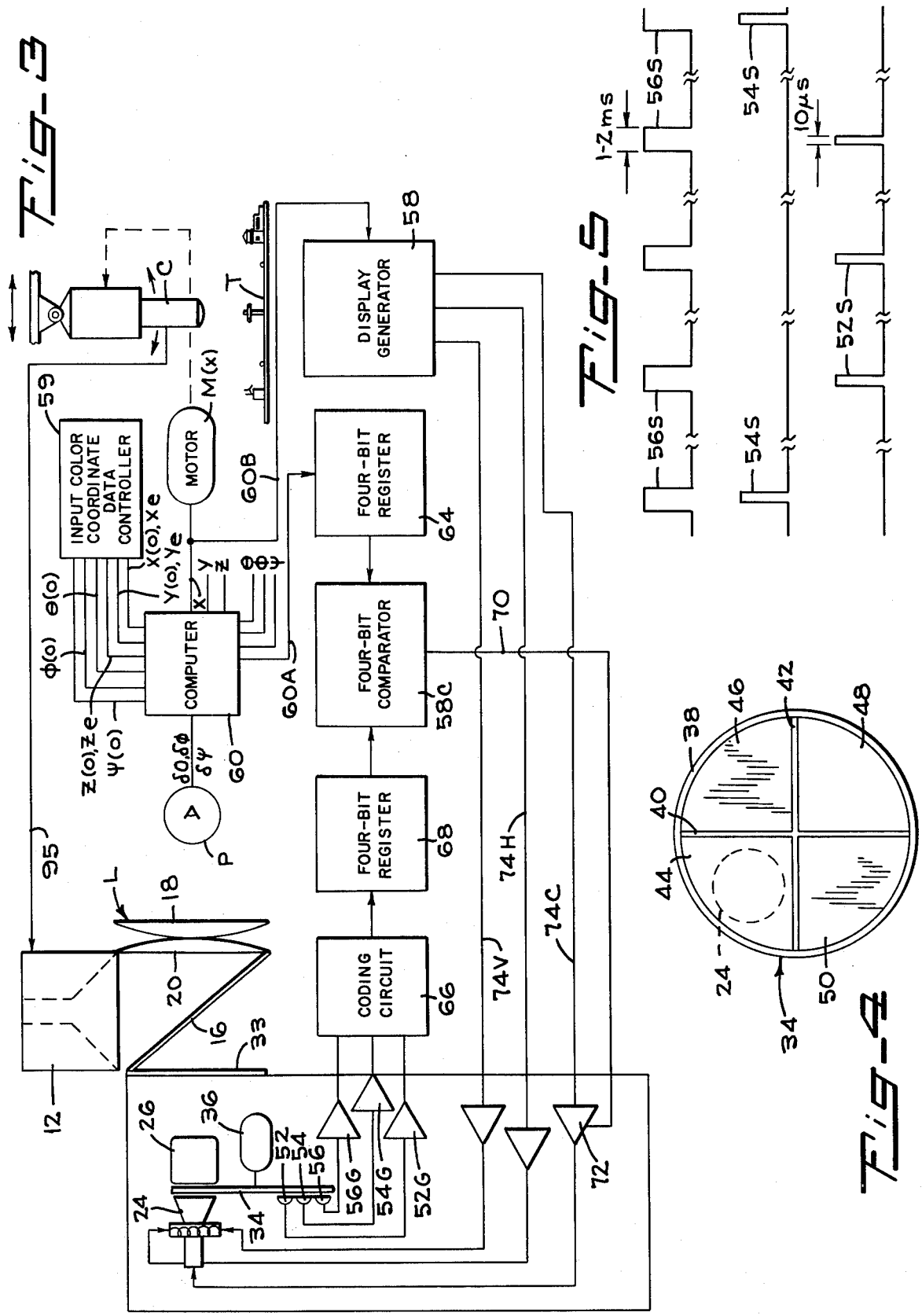

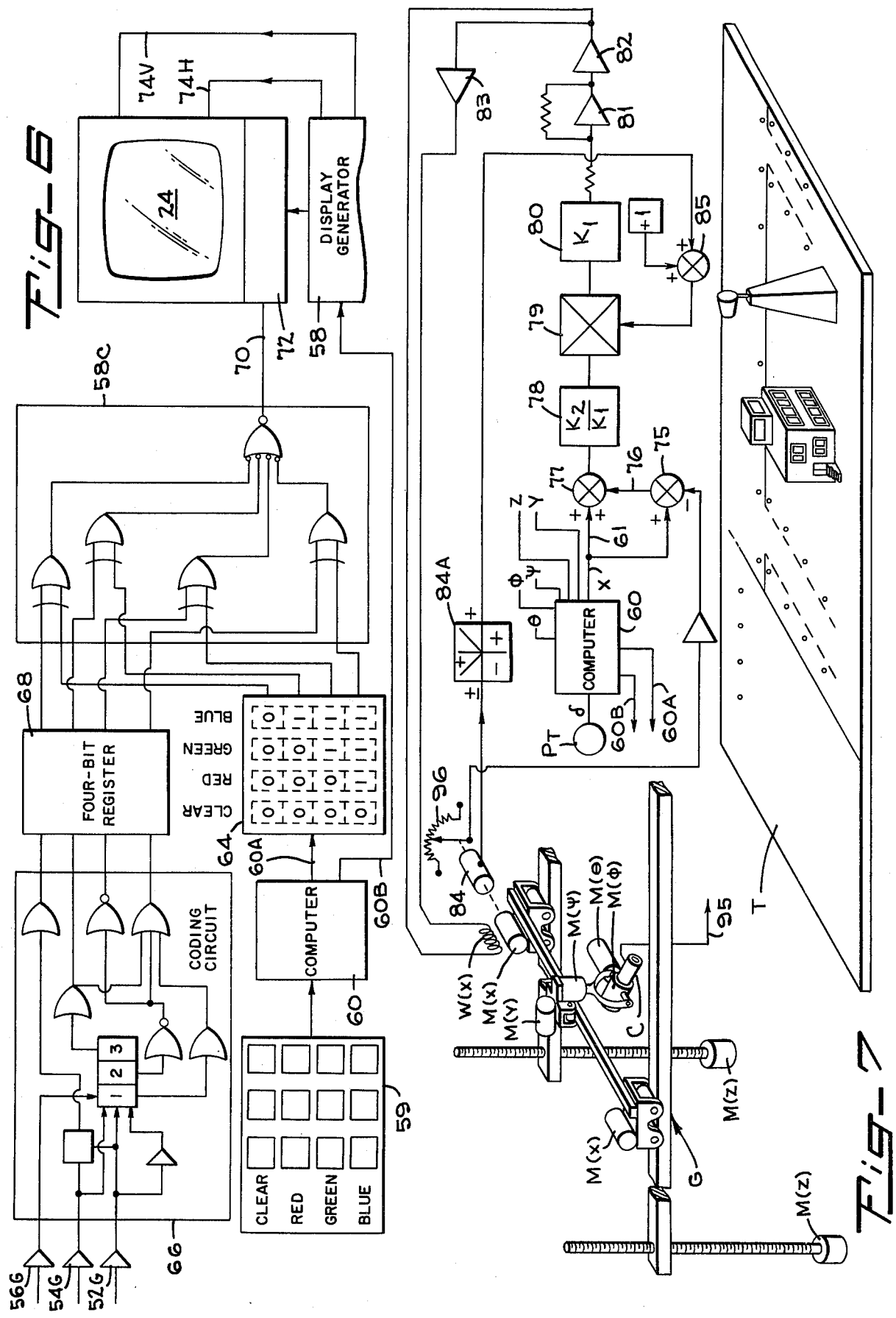

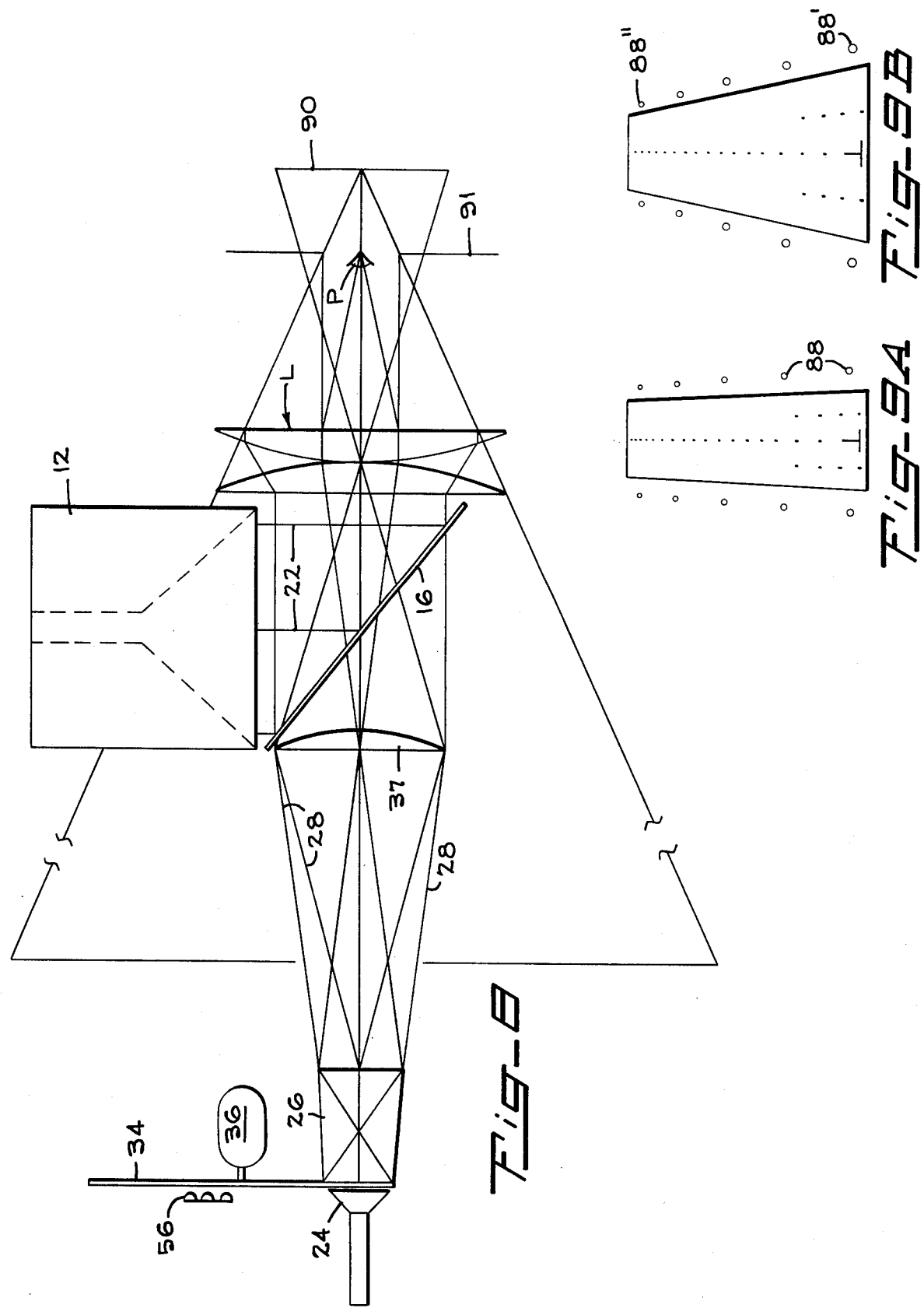

FULL COLOR HYBRID DISPLAY FOR AIRCRAFT SIMULATORS

The invention described herein was made by an employee of the United States Government, and may be manufactured and used by or for the government for governmental purposes without payment of any royalties thereon or therefor.

BACKGROUND OF THE INVENTION

1. Field of the Invention

This invention relates to an aircraft simulator and more particularly to a simulator that produces a full color representation of a landing strip including both the topographical features and the lights on or adjacent to the runway.

2. Description of the Prior Art

U.S. Pat. No. 2,938,279 to Hemstreet discloses a simulator that includes a photographic transparency of a landing strip and means for projecting an image of the transparency onto a board visible to the trainee at a size, angle and perspective corresponding to the simulated position on the simulator enclosure. No hybrid TV image is disclosed or suggested.

U.S. Pat. No. 2,261,912 to Hemstreet discloses a simulator employing a moving picture projector, the optical system of which is controlled in accordance with the trainee's manipulation of simulated aircraft controls.

U.S. Pat. No. 3,401,228 to Barnes discloses a flight simulator display employing two monochromatic CRT displays and an optical system for superimposing the images from the individual displays on one another for presentation to the trainee.

U.S. Pat. No. 3,542,933 to Davidoff discloses a simulator for synthesizing on a CRT the appearance of Fresnel landing approach device of the type employed on aircraft carriers. The artificial Fresnel presentation is superimposed on a screen on which the image of a carrier deck is also projected. A color wheel having two colors is employed in association with the Fresnel display, and the position of the Fresnel display relative the carrier deck is established by synchronizing the deflection yoke signals to the respective CRTs.

U.S. Pat. No. 3,573,338 to Davidoff discloses a computer for artificially generating the Fresnel image employed in the system disclosed in the above cited '933 patent.

U.S. Pat. No. 3,679,297 to Searle discloses a system employing two film transparencies which are optically projected and not converted into a CRT display.

U.S. Pat. No. 3,711,826 to LaRussa discloses a landing aid adapted for installation in aircraft employing two CRTs the outputs of which are superimposed to assist the pilot in landing the aircraft.

U.S. Pat. No. 3,761,156 discloses a simulator which produces a holographically reconstructed image such as a Fresnel image as employed on aircraft carriers.

SUMMARY OF THE INVENTION

The increasing cost of aircraft operation causes a corresponding increase in the desirability of providing flight simulators that produce a more realistic and accurate flight environment. Because the real world is multicolored, simulators should be capable of producing corresponding colors. The intensity range of conventional color TV scanning systems (i.e. 525 lines per frame) is limited, a fact that is particularly acute when landings at dusk or nighttime are simulated. At such times the outlines of obstructions near an air strip are extremely dim if visible at all and landing lights and the like are relatively very bright. Existing television systems, particularly color television systems, afford neither sufficient intensity range nor resolving capability to produce accurately the relatively obscure outlines as well as the relatively bright landing lights. According to the present invention, a hybrid image is produced, the normal topographical features and buildings being produced by a color TV scan system and the landing lights and the like being produced digitally on a calligraphic display system. One calligraphic display system presently commercially available is known as the Evans and Sutherland LDS-2. The LDS-2 can be employed as an element of the present invention to produce on a monochromatic CRT a pattern of dots, representative of landing lights, with a resolution corresponding to about 4,000 television lines and a light intensity range of up to about 1–1,000 foot lamberts. This range of intensity and resolution is sufficient to produce a realistic and properly proportioned simulated image of runway and taxiway lights, even at dusk or nighttime.

An object of the present invention is to provide a hybrid simulated signal producing apparatus that is accurate both as to color and as to relative intensity of the various features in the image. This object is achieved by producing images corresponding to relatively bright landing lights on a monochromatic calligraphic display and by providing a color wheel between the calligraphic display and the screen viewed by the trainee so that signals simulating landing lights are of the proper color and proper relative intensity.

Another object is to provide an improved system for synchronizing the calligraphically generated signal with the TV scan signal representative of the landing strip. The TV image of the landing strip is formed by moving a TV camera over a terrain board that simulates the landing strip of interest. Servo motors position the camera relative to the terrain board in six degrees of freedom. According to the invention there is a feedback system associated with each of the six servo motors which servo system produces an output that is fed to the calligraphic computer so that the calligraphic image corresponds with the TV image in shape, size and relative position at all times.

A further object of the present invention is to provide such servo feedback system that is stable at up to 10 hz so as to achieve optimum amplitude and phase correspondence between the TV signal and the calligraphic signal notwithstanding uneven or rapid movement of controls by the trainee.

The foregoing, together with other objects, features and advantages of the invention will be more apparent after referring to the following specification and accompanying drawings.

BRIEF DESCRIPTION OF THE DRAWINGS

FIG. 1 is a partially diagrammatic view of a full color hybrid simulator according to the present invention.

FIG. 2 is a schematic view of the optical system employed in the apparatus of FIG. 1.

FIG. 3 is a block diagram of a portion of the system for synchronizing the color wheel position with the remaining system elements.

FIG. 4 is a front elevation view of a color wheel according to the invention.

FIG. 5 is a plot of control signal amplitude vs time for synchronizing the rotational position of the color wheel with the other elements of the system.

FIG. 6 is a block diagram of circuitry for grating the calligraphically produced image with the video image.

FIG. 7 is a composite block diagram and schematic of the servo motor feedback system for shychronizing the size and shape of the calligraphic system with the size and shape of the color TV system. FIG. 8 is a view showing a modification of the optical system of FIG. 2.

FIG. 9a is a view of a simulated landing field as seen several miles out from the landing field.

FIG. 9b is a view similar to FIG. 9a showing the simulated landing field relatively closer to touchdown.

DESCRIPTION OF THE PREFERRED EMBODIMENT

Referring more particularly to the drawings, reference character E indicates an enclosure that simulates an aircraft cockpit and includes simulated controls such as a yoke Y for a pilot trainee P to manipulate. Enclosure E has a windscreen W in which is mounted a collimating lens L through which the pilot trainee P can view a simulated scene S. The topographical features of scene S are produced on a color TV monitor 12 and the landing and runway lights of the scene are produced by a calligraphic display 14, the images from the respective displays being combined via a 50% reflective - 50% transmissive beam splitter 16. There is control circuitry for synchronizing the images produced by TV monitor 12 and calligraphic display 14 so that they bear the proper relationship on an image I.

Having reference to FIG. 2, lens L can be formed by a pair of plano-convex lenses 18 and 20 which produce a realistic image notwithstanding minor head and eye movements of pilot trainee P. The color image from TV monitor 12 is projected on lens L along an optical path 22 that includes the front surface of beam splitter 16. Calligraphic display 14 includes a CRT 24, a projection lens 26 for projecting the image from CRT 24 along an optical path 28, the image being deflected by reflectors 30 and 32, onto the rear surface of a rear projection screen 33 for superposition onto optical path 22 from TV monitor 12. Thus pilot trainee P sees a composite image from TV monitor 12 and calligraphic display 14.

CRT 24 is a monochromatic device and there is interposed between the CRT and projection lens 26 a color wheel 34, which is supported on its central axis by the shaft of a motor 36. As seen in FIG. 4 color wheel 34 has a rigid circular frame 38 to which are secured two diametrically extending mutually perpendicular ribs 40 and 42. The ribs intersect at the center of circular frame 38, the shaft of motor 36 being connected in driving relation to such center. Ribs 40 and 42 divide the color wheel into four identically shaped sectors. Spanning the sectors are transparent tinted membranes or filters, there being a red membrane 44, a green membrane 46, a blue membrane 48 and a clear membrane 50. In response to rotation of color wheel 34, the different color membranes sequentially pass between CRT 24 and projection lens 26.

For producing control signals corresponding to the rotational position of color wheel 34 there is supported adjacent the color wheel and radially spaced from the shaft of motor 36, three light emitting infra-red diode detectors 52, 54 and 56 which are connected to respective detection amplifiers 52G, 54G and 56G. Detector 56 and its associated amplifier are arranged to produce "can't write" signals 56S (See FIG. 5) each time ribs 40 and 42 pass between CRT 24 and projection lens 26. Detector 54 and its associated amplifier is supplied with a filter so that it responds only to the red sector 44 and produces a pulse 54S which is used for synchronization and timing. Detector 52 and its associated amplifier produce a series of change field signals 52S which afford activation of the cathode of CRT 24 when the desired color sector is interposed between the CRT and projection lens 26. Because motor 36 is arranged to rotate at a variable rate between about 20–60 hz, the period between adjacent signals 52S and 56S ranges from about 4.17 ms (milliseconds) to about 12.5 ms. The period between adjacent pulses 54S is correspondingly between about 16.67 ms and about 50 ms. The output signals from detection amplifiers 52G, 54G and 56G are connected to a Grey code color circuit and then to a four bit comparator 58C, which is a sub-system of a digital display generator 58. As will be explained in more detail hereinafter, display generator 58 receives inputs in the form of color coordinate data 59 on a signal path 60A, and the computed aircraft position coordinates over signal path 60B from a computer 60 as well as from detection amplifiers 52G, 54G and 56G to drive the deflection coils and cathode of CRT 24.

The input color coordinate data 59 to computer 60 is fed on signal path 60A (FIGS. 3 and 6) and is indicative of the color of simulated runway and/or taxiway lights at various positions throughout the image. The color coordinate signal sorted by color on path 60A is converted into Grey scale four-bit code, each of the four colors, red, green, blue and clear having a unique signal in the code. Such code feeds the input of a four-bit register 64 the output of which is connected to four-bit comparator 58C, each of which resides within display generator 58. Signals 52S, 54S and 56S are fed to respective detection amplifiers 52G, 54G and 56G and thence to coding circuit 66, which in response to the inputs thereto generates an appropriately coded unique signal for each of the four segments of color wheel 34. The output of coding circuit 66 feeds a four-bit register 68 which has its output connected to comparator 58C, so that when a signal corresponding to the required color received from computer 60 on input 60A coincides with alignment of an appropriately tinted filter element on color wheel 34 with CRT 24, a signal is produced at output 70 to unblank the video amplifier 72 of CRT 24. This causes formation of the appropriate number of spots on the face of CRT 24 at a time which corresponds to interposition of the appropriate filter on color wheel 34 between the CRT and projection lens 26. Display generator 58 produces horizontal and vertical deflection signals on conductors 74H and 74V as well as a video or cathode signal on conductor 74C.

For assuring that the calligraphic signal produced on CRT 24 is properly synchronized with the TV runway scene displayed on TV monitor 12, there are inputs fed to computer 60 that correspond to the location of the TV camera tube relative to the terrain board. In FIG. 7, the TV camera is electrically connected to monitor 12 by a conductor path 95 and mechanically supported on a gantry frame G for movement in six degrees of freedom. There are six servo motors for establishing the six degrees of freedom of movement, there being a motor M (Z) for establishing the altitude or height of camera C over terrain board T; a motor M(x) for establishing the distance from the camera to the runway on terrain board T; a motor M(y) for establishing the position of camera C relative the runway center line; a motor M(θ) for establishing the pitch angle of camera C; a motor M(φ) for establishing the roll angle of the camera; and a motor M(Ψ) for establishing the heading angle of the camera. Because the feedback system for each of the six motors is substantially identical, the description of one will be adequate to exemplify all the feedback circuits. Manipulation of the controls by pilot P activates a transducer $P_T$ which produces a signal indicated by δ in FIG. 7, which constitutes an input to computer 60. The computer generates a servo input drive signal at its output 61 which is summed at a summing point 75 with a signal from a followup potentiometer 96. The followup potentiometer produces a voltage proportional to the position of the shaft of servo motor M(x). An error signal is thus generated on lead 76 which is summed with output 61 at summing point 77 and fed through a feed forward gain amplifier 78 to one input of a multiplier 79. The gain ratio of amplifier 78 is chosen such that $K_2 = K_1 + 1$. The output of multiplier 79 is fed through an open loop gain amplifier 80 and modified by amplifiers 81, 82 and 83 for transmission to the field winding W(x) of motor m(x), thereby controlling the motion of the motor and effecting appropriate movement of camera C toward the image on terrain board T. Also connected to the shaft of motor M(x) is a tachometer generator 84 which produces a signal proportional to the velocity of change in the value of X. This velocity signal is further modified by the absolute value circuit 84A to keep the velocity signal positive. The absolute value output of tachometer generator 84 through circuit 84A is added to a normalized unit positive value at summing point 85 and then to a second input of multiplier 79. The shaft output of motor M(x) is thus optimized and used to position TV camera C with respect to the terrain board T in such a manner as to represent the motion of the aircraft according to input command from pilot P. Moreover, the pilot input command δ continuously updates the signals stored in computer 60 which in turn controls generation of a correctly sized and positioned calligraphic display on CRT 24 and gates the CRT display in synchronism with the position of color wheel 34.

In operation, pilot trainee P is seated in simulator enclosure E and coordinates indicative of the initial simulated position of the aircraft relative to terrain board T are introduced via coordinate controller 59. The initial position of TV camera C and therefore the initial image produced on the screen of TV monitor 12 are established by introducing into computer 60 appropriate initial values of X(o), Y(o), X(o), θ(o), φ(o) and ψ(o). Also introduced from coordinate controller into computer 60 are corresponding initial positions for the landing lights displayed in CRT 24, such initial information being identified as $X_e$, $Y_e$, and $Z_e$. The system is then activated and the pilot observes on lens L a composite image from color TV monitor 12 and calligraphic CRT 24. Because CRT 24 is a monochromatic device, wide variations in intensity are afforded and the presence of color wheel 34 and the associated synchronizing circuitry present to the pilot an accurate view of terrain board T which is in full color and in which the relative intensity of the topographical characteristics of the runway and the landing, runway and taxiway lights correspond closely with that in the real world. Because of the broad intensity range possible with CRT 24, it is feasible to start the simulated maneuver at a distance corresponding to 20-25 miles out from the runway, a distance in the real world at which landing lights are visible to a pilot with normal visual acuity. As the pilot trainee manipulates the simulated controls within enclosure E, continuing signals represented by $δ_θ$, $δ_φ$ and $δ_ψ$ in FIGS. 3 and 7 are supplied to computer 60 which is programmed in accordance with the characteristics of the aircraft being simulated, the prevailing weather and like parameters. Computer 60 produces suitable control signals for the servo motors on the gantry frame G that supports and aims TV camera C. Because camera C is connected to TV monitor 12 on conductor path 95, the image perceived from the monitor changes in response to the trainee's maneuvers. Computer 60 also drives display generator 58 with inputs provided along path 60B which supplies the updated aircraft position so as to effect a corresponding modification in the calligraphic perspective pattern produced on CRT 24. The broad intensity range afforded by the latter CRT assures an accurate representation of light intensity, and the gating system depicted in FIG. 6 provides reliable synchronization between the rotational position of color wheel 34 and the state of computer 60 to afford accurate colors for the landing and runway lights.

Because the topographical features in the simulated image are produced by a system independent of the system employed for producing the landing and runway light pattern, it is important to assure synchronization between the displays from the two systems even in the presence of rapid or erratic movement of the controls in enclosure E, i.e. rapid and erratic rates of changes of $δ_θ$, $δ_φ$, and $δ_ψ$. Such synchronization is afforded by the servo control system of FIG. 7, because the system allows the bandwidths of the servo motors M that position camera C in the gantry frame to be increased by about 20 times with no appreciable loss in signal amplitude and with phase shifts not greater than about 5° at the critical frequencies. Such minor amount of phase shift is tolerable to the trainee and represents the extreme case where the trainee jiggles the simulated controls at a rate of about 10 hz, a rare occurrence with trainees of any significant degree of experience.

The advantages afforded by the present invention can be appreciated by comparing the simulation of a landing maneuver at night. In the daylight situation the TV image produced by monitor 12 will be well lighted and very bright. Because CRT 24 has a capability of producing up to about 1,000 foot lamberts of white light, however, extremely bright lights such as are used in a strobe pattern arranged along a line that extends longitudinally of the runway will exhibit on lens L an intensity corresponding to what would be expected in the real world. At nighttime the image from color TV monitor 12 will be either very dim or non-existent, at least when camera C is spaced from terrain board T by a distance corresponding to 20-25 miles. At such range in the real world the surrounding runway edge, taxiway and landing approach lights as well as other terrain lights on the terrain board of FIG. 7 would be visible but would be relatively dim. The broad range of intensity possible with CRT 24, together with the presence of color wheel 34, assures that even in the simulated nighttime scene an accurate composite image is produced. As the simulated maneuver proceeds the intensity and relative size of the simulated lights generated by CRT 24 become larger but still remain in the proper size and intensity relationship to the image produced on TV monitor 12.

FIGS. 9A and 9B indicate in schematic fashion the advantages afforded by the hybrid image produced according to the invention. FIG. 9A indicates the image produced for representing a position during a landing maneuver about three miles out from the runway. In such position the runway appears almost rectangular and the runway lights indicated by circles 88 are of substantially uniform brightness. Such brightness, which is controlled by computer 60 and displayed on CRT 24, is well within the capabilities of the system to reproduce. FIG. 9B indicates the image presented to simulate the appearance of the runway at or near touchdown. The intensity of lights 88' at the near end of the runway that the pilot is approaching is relatively bright because such lights are in close proximity to the pilot. The more distant lights along the center and edges of the runway and beyond the runway, indicated at 88", will appear to be less bright, a phenomenon occurring because apparent brightness decreases as the square of the distance from the light source. Less bright lights 88" are indicated in FIG. 9B by the relatively smaller diameter of the circles corresponding to such lights. Production of different intensities on CRT 24 is well within the capacity of the system and because the CRT is a monochromatic device, changes in intensity occur at a sufficiently rapid rate that an accurate image is produced. Finally the presence of color wheel 34 and the synchronization circuitry associated therewith assures that the images of the lights will be presented in the correct color.

An alternate embodiment of an optical system for superposing the calligraphic image from CRT 24 onto the color TV image of TV monitor 12 is shown in FIG. 8. The elements of the embodiment of FIG. 8 that are common to the embodiment of FIG. 2 bear identical reference numerals. The embodiment of FIG. 8 eliminates a rear projection screen identified at 33 in the embodiment of FIG. 2, and substitutes a plano convex field lens 37 disposed in the focal plane of projection lens 26. This embodiment may also eliminate the reflectors identified at 30 and 32 in FIG. 2 which conserves space and which eliminates the optical losses caused by the presence of the reflectors. Accordingly an image that is brighter by about an order of magnitude is displayed to pilot trainee P who now views a real image of the scene. The embodiment of FIG. 8, however, forms the image from CRT 24 at a plane 91 which is slightly displaced from the plane 90 from which the image of the color TV monitor 12 is viewed. The amount of offset between the two planes on one system designed according to the invention is only about 6 inches, a distance that does not severely affect the utility and advantages afforded by the invention.

Thus it will be seen that the present invention provides a full color hybrid image producing system for aircraft simulators which is operable throughout a sufficiently broad range of light intensities that landings either at nighttime or daytime can be simulated with accuracy. This advantageous result is afforded by employing a monochromatic CRT on which the images of the runway, landing and taxiway lights are digitally produced and by superimposing such images onto a color TV monitor which is operated in conjunction with a camera and a terrain board in a conventional manner. The monochromatic CRT is capable of producing an extremely broad range of intensities as compared to the image produced by raster scan on the color TV monitor. Finally the color wheel and its associated circuitry affords presentation of the airport lights in their correct color pattern so that pilot time spent in a simulator constructed according to the invention is much more effective than has heretofore been feasible.

Although two embodiments of the invention have been shown and described it will be obvious that other adaptations and modifications can be made without departing from the true spirit and scope of the invention.

That which is claimed is:

1. Apparatus for visually simulating to a pilot trainee a representation of an aircraft landing site having a number of light sources, said representation being in full-spectrum color, said apparatus comprising a color TV monitor; means connected to said monitor for producing an image on said monitor representative of said site; a cathode ray tube having a range of light intensity exceeding the range of light intensity of said color TV monitor by at least an order of magnitude; means connected to said cathode ray tube for generating a digital calligraphic monochromatic image representative of said light sources; means for converting said monochromatic calligraphic image to a full-color spectrum calligraphic image; said last means comprising a color wheel adjacent the face of said cathode ray tube having three transparent sector-shaped elements of different colors and one clear element, means for rotating said color wheel, and means for synchronizing the excitation of said cathode ray tube with the rotational position of said color wheel so that the color of each light source is accurately represented in the converted calligraphic image; means for superimposing and combining said color TV monitor image and said full-color spectrum calligraphic image; and optical means for enabling said traineee to observe the superimposed and combined images.

2. Apparatus according to claim 1 wherein said color wheel includes a red element, a green element and a blue element, and said synchronizing means comprises means for detecting the position of the color wheel elements with respect to said cathode ray tube, means for generating a first binary coded signal wherein at any given time the code corresponds to the color wheel element in front of said cathode ray tube, means for generating a second binary coded signal wherein the code varies in time depending on the color desired in said calligraphic image, and comparator means for activating said cathode ray tube when said first and second binary coded signals are in coincidence.

3. Apparatus according to claim 2 wherein said site image producing means comprises a TV camera connected to said monitor, a terrain board having topographic features simulating an aircraft landing site, means for positioning said TV camera for movement relative to said terrain board, said positioning means including at least one servo motor, means accessible to said trainee for simulating an aircraft control, and means responsive to said aircraft control simulating means for driving said servo motor.

4. Apparatus according to claim 3 wherein said driving means comprises a computer having an output connected to said servo motor and first, second and third inputs, said aircraft control simulating means being connected to said first input, transducer means for producing a signal proportional to the rate of movement of said servo motor and being connected to said second input, and transducer means for producing a signal proportional to the position of said servo motor being connected to said third input.

5. Apparatus according to claim 1 wherein said superimposing and combining means comprises a 50% reflective - 50% transmissive beam splitter disposed intermediate said color wheel and said optical means, and means including a projection lens intermediate said color wheel and said beam splitter for projecting said digital calligraphic image onto said beam splitter.

6. Apparatus according to claim 5 including a rear imaging screen disposed between said projection lens and said beam splitter and means including first and second parallely supported reflectors for reflecting the image produced by said projection lens to said rear imaging screen.

7. Flight simulating apparatus comprising a terrain board having a miniature simulated scene of a landing strip or the like thereon, a TV camera for producing a video signal of said scene, a video monitor for displaying an image representative of the scene viewed by said TV camera, at least one servo means with a servo motor for positioning said TV camera relative to said scene in response to control manipulations by a trainee who has visual access to said video monitor, calligraphic digital display means for generating a calligraphic image simulating the light sources associated with said scene, said calligraphic image being superimposed on said TV camera image at said monitor, computer means for controlling said calligraphic digital display means and generating an input signal to said servo means which is a function of the control manipulations of said trainee, means coupled to said servo means for generating a first error signal proportional to the position error of said TV camera, means coupled to said servo means for generating a second error signal, always positive in polarity, which is proportional to the rate-of-movement error of said TV camera, said servo means including a nonlinear amplifying means, said nonlinear amplifying means comprising a multiplier with first and second inputs, said first input being a function of said input signal and said first error signal, said second input being $(V+1)$ wherein V represents the second error signal whereby the bandwidth of said servo means is increased and said TV camera image is in substantial alignment with said calligraphic image.

* * * * *